United States Patent
Gurr et al.

(10) Patent No.: US 11,276,889 B2
(45) Date of Patent: Mar. 15, 2022

(54) DEVICE FOR CAPTURING OPERATING DATA OF A MOTOR-DRIVEN TOOL, AND SYSTEM

(71) Applicant: Andreas Stihl AG & Co. KG, Waiblingen (DE)

(72) Inventors: Kay-Steffen Gurr, Heilbronn (DE); Andre Vaas, Jagstzell (DE)

(73) Assignee: Andreas Stihl AG & Co., KG, Waiblingen (DE)

( * ) Notice: Subject to any disclaimer, the term of this patent is extended or adjusted under 35 U.S.C. 154(b) by 370 days.

(21) Appl. No.: 16/402,312

(22) Filed: May 3, 2019

(65) Prior Publication Data
US 2019/0341660 A1 Nov. 7, 2019

(30) Foreign Application Priority Data
May 4, 2018 (EP) .................................. 18170891

(51) Int. Cl.
H02J 7/04 (2006.01)
H01M 10/44 (2006.01)
G07C 3/00 (2006.01)
H01M 10/42 (2006.01)
H01M 10/48 (2006.01)

(52) U.S. Cl.
CPC .......... *H01M 10/443* (2013.01); *G07C 3/00* (2013.01); *H01M 10/4264* (2013.01); *H01M 10/486* (2013.01); *H01M 2010/4271* (2013.01)

(58) Field of Classification Search
None
See application file for complete search history.

(56) References Cited

U.S. PATENT DOCUMENTS

| 2006/0214627 A1 | 9/2006 | Ito et al. |
| 2006/0290306 A1* | 12/2006 | Broghammer ..... H03K 17/0822 318/434 |
| 2011/0208170 A1* | 8/2011 | Hafner .................. A61B 90/98 606/1 |

(Continued)

FOREIGN PATENT DOCUMENTS

| EP | 1 708 335 A2 | 10/2006 |
| EP | 2 477 270 A1 | 7/2012 |

(Continued)

OTHER PUBLICATIONS

German-language European Search Report issued in counterpart European Application No. 18170891.8 dated Oct. 16, 2018 with partial English translation (11 pages).

*Primary Examiner* — Arun C Williams
(74) *Attorney, Agent, or Firm* — Crowell & Moring LLP

(57) ABSTRACT

A device for capturing operating data of a motor-driven tool includes a capture and/or evaluation device, an operating data memory, and/or a communication interface. These components draw electric power from an electrochemical energy store during operation. An operating mode control device operates the components at a temperature above a temperature limit value in a normal temperature operating mode and at a temperature equal to or below the temperature limit value in a low temperature operating mode different from the normal mode, wherein less electric power is drawn in the low temperature operating mode.

20 Claims, 5 Drawing Sheets

(56) References Cited

U.S. PATENT DOCUMENTS

| | | | | |
|---|---|---|---|---|
| 2011/0273806 A1* | 11/2011 | Roehm | ................... | B25F 5/00 |
| | | | | 361/93.8 |
| 2012/0176097 A1 | 7/2012 | Takezawa et al. | | |
| 2016/0145974 A1* | 5/2016 | Tahoun | ................. | E21B 47/00 |
| | | | | 175/50 |
| 2018/0068493 A1 | 3/2018 | Russ et al. | | |
| 2019/0115772 A1* | 4/2019 | Takeda | ................. | H02J 7/0063 |

FOREIGN PATENT DOCUMENTS

| | | |
|---|---|---|
| EP | 3 291 181 A1 | 3/2018 |
| WO | WO 2013/134715 A2 | 9/2013 |

* cited by examiner

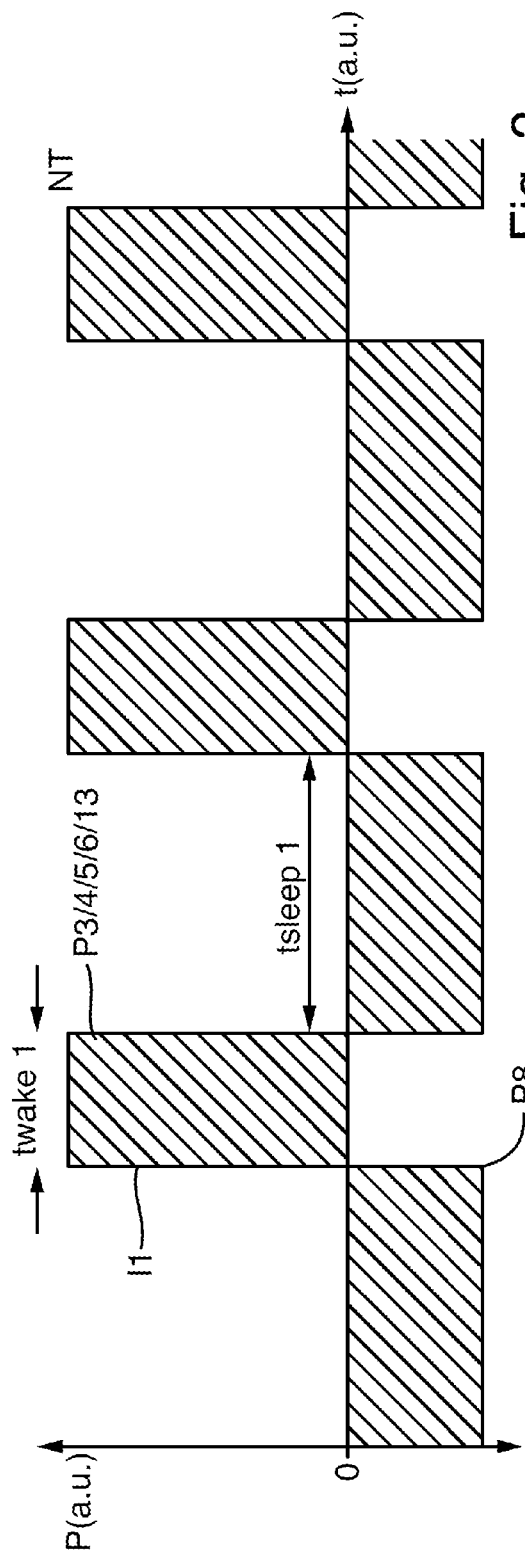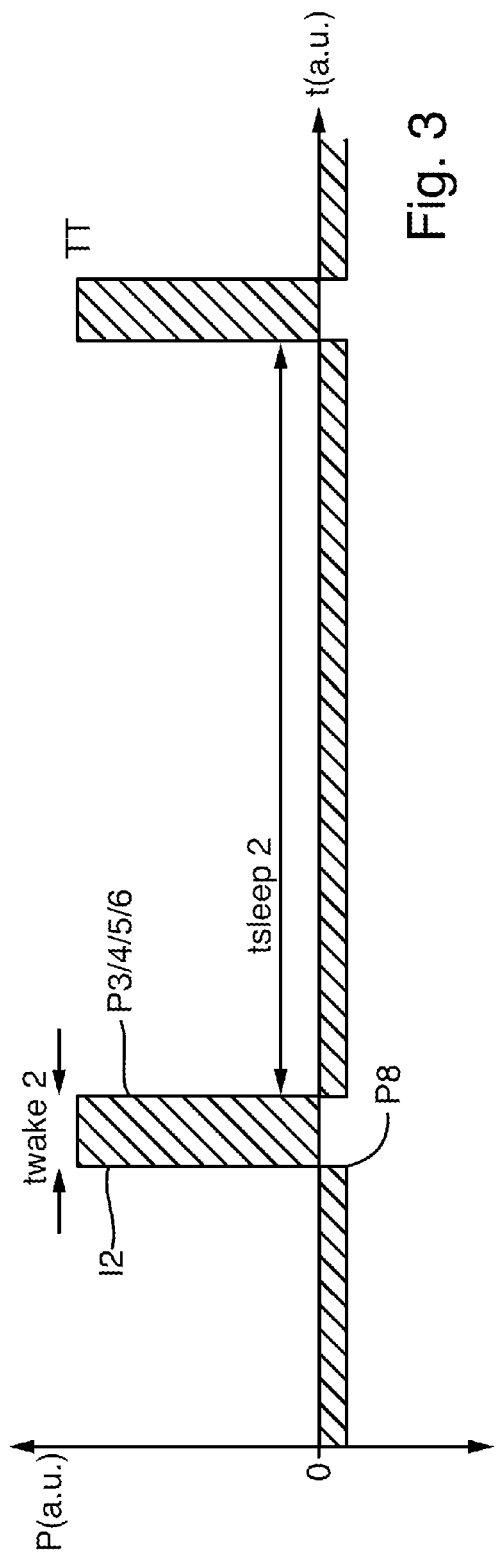

DEVICE FOR CAPTURING OPERATING DATA OF A MOTOR-DRIVEN TOOL, AND SYSTEM

CROSS REFERENCE TO RELATED APPLICATIONS

This application claims priority under 35 U.S.C. § 119 from European Patent Application No. 18170891.8, filed May 4, 2018, the entire disclosure of which is herein expressly incorporated by reference.

BACKGROUND AND SUMMARY OF THE INVENTION

The invention relates to a device for capturing operating data of a motor-driven tool and to a system having such a device and a motor-driven tool.

The invention is based on the object of providing a device for capturing operating data of a motor-driven tool, which device is reliable, and a system having such a device and a motor-driven tool.

The device according to the invention for capturing operating data of a motor-driven tool is designed for arrangement on, in particular in, the tool. The device has a, in particular electrical, capture and/or evaluation device. The capture and/or evaluation device is designed to capture at least one, in particular physical, quantity, in particular a value or an absolute value of the quantity, wherein the quantity, in particular the value thereof, is dependent on an operating state of the tool, and to evaluate the captured quantity, in particular the value thereof, in particular automatically, for the purpose of ascertaining the operating data. Additionally or alternatively, the capture and/or evaluation device is designed to capture operating data, in particular automatically. In addition, the device has an, in particular electrical, operating data memory and/or a, in particular electrical, communication interface. The operating data memory is designed to store the ascertained and/or captured operating data, in particular automatically. The communication interface is designed to transmit or to send the, in particular stored, operating data wirelessly to a terminal, in particular automatically. The capture and/or evaluation device, the operating data memory and/or the communication interface is/are designed to draw electric power from an electrochemical energy store, in particular a battery, or to be supplied with electric power by the electrochemical energy store, in particular the battery, in particular automatically, during, in particular respective, operation. Additionally, the device has an, in particular electrical, operating mode control device. The operating mode control device is designed to operate, in particular automatically, the capture and/or evaluation device, the operating data memory and/or the communication interface at a temperature, in particular a value or an absolute value of the temperature, above a, in particular respective, temperature limit value in a, in particular respective, normal temperature operating mode and at a temperature, in particular a value or an absolute value of the temperature, equal to or below the temperature limit value in a, in particular respective, low temperature operating mode, which is different from the normal temperature operating mode, such that less electric power is drawn from the electrochemical energy store, in particular the battery, in particular by the capture and/or evaluation device, the operating data memory and/or the communication interface, in the low temperature operating mode than in the normal temperature operating mode.

The device or the capture and/or evaluation device thereof, the operating data memory thereof and/or the communication interface thereof allow(s) the operating data to be captured, stored and/or transmitted.

In addition, the device or the operating mode control device thereof, in particular the low temperature operating mode, allows gentle operation of the electrochemical energy store, in particular the battery, and hence operation with the electrochemical energy store, in particular the battery, for a relatively long time, and hence reliable operation, in particular at a low temperature.

In detail, as temperature falls, a resistance, in particular an internal resistance, of the electrochemical energy store, in particular of the battery, can increase or rise. Therefore, as temperature falls, a power that can be drawn, in particular without damage, from the electrochemical energy store can fall. An excessively high power draw can lead to irreversible processes in the electrochemical energy store and therefore to permanent damage to the electrochemical energy store. The device or the operating mode control device thereof, in particular the low temperature operating mode, allows damage to the electrochemical energy store to be prevented, in particular at a low temperature.

In particular, the device can be designed for, in particular mechanical, coupling to or mounting or attachment on/to, in particular in, the tool. In particular, the device can be designed for, in particular detachable, connection to the tool, in particular by means of a material bond such as an adhesive bond, a force-fit connection such as a latching or snap-fit connection and/or a form-fit connection such as a screw joint. Additionally or alternatively, the device can be arranged on, in particular in, the tool, in particular can be part of the tool. Alternatively, the device can be designed to be separate from the tool. This allows the device to be retrofitted to the tool. In particular, the device can be referred to as a unit. As a further addition or alternative, the device, when arranged on the tool, can be in direct contact with the tool, in particular with a tool housing or a cover of the tool.

The tool can have an electric drive motor or an internal combustion drive engine or can be driven by means of an electric motor or an internal combustion engine.

The capture and/or evaluation device can be designed to capture the at least one quantity and/or the operating data wirelessly, in particular without having an electrically conductive connection to the tool or to components of the tool.

In particular, the capture and/or evaluation device can have a sensor, wherein the sensor can be designed to capture or measure the at least one quantity. The quantity can be referred to as a measured quantity. In particular, the sensor can be designed to allow it to be capable of capturing the quantity regardless of whether the tool can be driven by means of an electric motor or an internal combustion engine. Therefore, quantities and hence also operating data for a large number of drive technologies such as internal-combustion-engine-driven, wired, storage-battery-based can be captured using the same device, in particular without a wired connection to the tool or to components of the tool needing to be required. Additionally or alternatively, the sensor can be an inductive sensor, such as at least one coil. The inductive sensor can allow, in particular during operation of the tool, changing electromagnetic and/or magnetic fields to be measured or detected, in particular caused by stray fields from electric motors, ignition pulses from internal combustion engines, changes of current, moving magnets in a flywheel of the tool, of a generator, etc. In this regard, reference should also be made to the relevant specialist literature.

Additionally or alternatively, the capture and/or evaluation device can have or be a microcontroller.

As a further addition or alternative, the operating data can be an operating period or operating hours of the tool, in particular during which the electric motor, if present, or the internal combustion engine, if present, can be active. It goes without saying that the operating data can be not only the operating period but also further data relevant to tool operation, such as drive temperatures, drive powers, load data, tool-user-related data, states of charge and/or voltage states of an energy store, locations of use, etc. In this regard, reference should also be made to the relevant specialist literature.

The operating data memory can be electrically connected to the capture and/or evaluation device.

The communication interface can be electrically connected to the capture and/or evaluation device and/or to the operating data memory. Additionally or alternatively, the communication interface can have or be a WLAN interface and/or a Bluetooth interface. As a further addition or alternative, the communication interface can be designed to transmit regardless of whether or not a terminal is in range. In this regard, reference should also be made to the relevant specialist literature.

The terminal can for example take the received operating data as a basis for performing evaluations of the operating data and can present said operating data to a user in visually conditioned form.

The electrochemical energy store, in particular the battery, if present, can be the sole or only energy source of the device, in particular if the tool can be or is not active. In other words: the device can be without an external energy source or power supply, in particular if the tool can be or is not active.

The temperature can be a temperature of the electrochemical energy store, in particular the battery, and/or of an environment of the electrochemical energy store.

The normal temperature operating mode can be referred to as a normal temperature mode. Additionally or alternatively, the low temperature operating mode can be referred to as a low temperature mode.

The power drawn can be a peak power and/or an average power.

The operating mode control device can be electrically connected to the capture and/or evaluation device, the operating data memory and/or the communication interface. In addition, the operating mode control device can be electrically connected to the electrochemical energy store, in particular the battery, if present. In particular, the operating mode control device can be electrically connected firstly to the capture and/or evaluation device, the operating data memory and/or the communication interface and secondly to the electrochemical energy store, if present, or can be interposed. In other words: the capture and/or evaluation device, the operating data memory and/or the communication interface can, in particular each, be electrically connected to the electrochemical energy store, if present, by means of the operating mode control device. Put another way: the capture and/or evaluation device, the operating data memory and/or the communication interface need, in particular each, not be electrically connected directly to the electrochemical energy store, if present. Additionally or alternatively, the operating mode control device can have or be a microcontroller and/or a memory.

The device or the capture and/or evaluation device thereof, the operating data memory thereof, the communication interface thereof and/or the operating mode control device thereof can be designed for a voltage of no less than 1 volt (V) and/or of no more than 12 V, in particular of 3 V. Additionally or alternatively, the device can be referred to as an electrical device.

In one development of the invention, the device has the electrochemical energy store, in particular the battery. In particular, the electrochemical energy store can be designed to supply the capture and/or evaluation device, the operating data memory, the communication interface and/or the operating mode control device with electric power during, in particular respective, operation. Additionally or alternatively, a voltage, in particular a value or an absolute value of the voltage, of the electrochemical energy store, in particular the battery, can be no less than 1 V and/or no more than 12 V, in particular 3 V. As a further addition or alternative, the electrochemical energy store, in particular the battery, can be of rechargeable or non-rechargeable design. The rechargeable battery can be referred to as a storage battery. As a further addition or alternative, the battery can be a button cell, in particular a CR 2032 button cell or CR 2450 button cell, and/or a lithium ion battery.

In one development of the invention, the temperature limit value is no more than plus (+) 10 degrees Celsius (° C.) in particular no more than 0° C., and/or no less than minus (−) 20° C., in particular no less than −10° C., in particular −5° C.

In one development of the invention, the device has a, in particular electrical, temperature sensor. The temperature sensor is designed to, in particular automatically, capture or measure the temperature, in particular a value or an absolute value of the temperature, and/or a quantity dependent on the temperature, in particular a value or an absolute value of the quantity. The operating mode control device is designed to operate the capture and/or evaluation device, the operating data memory and/or the communication interface, in particular automatically, in the normal temperature operating mode when the temperature limit value is exceeded by the captured or measured temperature, in particular the value thereof, or a quantity limit value is exceeded by the captured or measured quantity, in particular the value thereof, and in the low temperature operating mode when the temperature limit value is reached or not reached by the captured or measured temperature, in particular the value thereof, or the quantity limit value is reached or not reached by the captured or measured quantity, in particular the value thereof. In particular, the temperature sensor can be thermally connected to the electrochemical energy store, in particular the battery, if present. In particular, the temperature sensor can be arranged at a distance of no more than 5 centimetres (cm), in particular of no more than 2 cm, in particular of no more than 1 cm, from the electrochemical energy store, if present, or in direct contact with the electrochemical energy store, if present. Additionally or alternatively, the operating mode control device can be electrically connected to the temperature sensor.

In one development of the invention, the device has a, in particular electrical, resistance capture device, in particular a resistance sensor. The resistance capture device is designed for, in particular automatically, capturing or measuring a, in particular the, resistance, in particular a value or an absolute value of the resistance, in particular internal resistance, of the electrochemical energy store, in particular the battery, and/or a quantity dependent on the resistance, in particular a value or an absolute value of the quantity. The operating mode control device is designed to operate the capture and/or evaluation device, the operating data memory and/or the communication interface, in particular automatically, in the normal temperature operating mode when a resistance limit value is not reached by the captured or measured resistance, in particular the value thereof, or a quantity limit value is not reached by the captured or measured quantity, in particular the value thereof, and in the low temperature operating mode when the resistance limit value is reached or exceeded by the captured or measured resistance, in particular the value thereof, or the quantity limit value is reached or exceeded by the captured or measured quantity, in particular the value thereof. In detail, the resistance, in particular the internal resistance, of the electrochemical energy store, in particular of the battery, can be dependent on temperature or correlated or linked to temperature or a function of temperature. In particular, the resistance capture device can be electrically connected to the electrochemical energy store, if present. Additionally or alternatively, the operating mode control device can be electrically connected to the resistance capture device.

In one refinement of the invention, the resistance limit value is no less than 100 ohms (Ω), in particular no less than 500Ω, and/or no more than 20 kiloohms (kΩ), in particular no more than 2 kΩ, in particular 1 kΩ.

In one development of the invention, the operating mode control device is designed to operate the capture and/or evaluation device, the operating data memory and/or the communication interface in the normal temperature operating mode periodically in, in particular respective, intervals during a, in particular respective, first active period and not to operate it/them during a, in particular respective, first inactive period, in particular between the intervals, and to operate it/them in the low temperature mode periodically in, in particular respective, intervals during a second active period, which is shorter in time than the first, and/or not to operate it/them during a, in particular respective, second inactive period, which is longer in time than the first, in particular between the intervals, or to render it/them without power or without function, or not to operate it/them, in particular automatically. In particular, the capture and/or evaluation device, the operating data memory and/or the communication interface can, in particular each, be supplied with electric power or activated during the active period and not supplied with electric power or deactivated during the inactive period. Additionally or alternatively, the first active period and the second active period can be of the same length in time and the first inactive period and the second inactive period can be of different length in time. As a further addition or alternative, the device can be designed to split work tasks that are longer in time over multiple intervals.

In one refinement of the invention, the first active period is no less than 1 millisecond (ms) and/or no more than 3 seconds (s), in particular 80 ms. Additionally or alternatively, the first inactive period is no less than 100 ms and/or no more than 10 s, in particular 920 ms. As a further addition or alternative, the second active period is no less than 1 ms and/or no more than 3 s, in particular 40 ms. As a further addition or alternative, the second inactive period is no less than 500 ms and/or no more than 10 s, in particular 1960 ms.

In one refinement of the invention, the operating mode control device is designed to respond to non-capture of a quantity or operating data by means of the capture and/or evaluation device by setting the first inactive period to a maximum value and/or the second inactive period to a maximum value, in particular automatically. This allows a relatively low power consumption, in particular if the tool can be or is not active, and therefore a relatively long lifespan for the electrochemical energy store, in particular the battery, if present. Additionally, the operating mode control device can be designed to respond to capture of the quantity or operating data by means of the capture and/or evaluation device by setting the first inactive period to a minimum value and/or the second inactive period to a minimum value. As a further addition or alternative, the operating mode control device can be designed to set the first inactive period to a maximum value and/or the second inactive period to a maximum value, in particular automatically, when there is non-capture for a lengthy time and/or when there is capture for a lengthy time, in particular when a time limit value is reached or exceeded by a period since the non-capture or capture began, or when there is no change.

In one development of the invention, the device has a, in particular electrical, buffer capacitor. The buffer capacitor is designed to draw electric power from the electrochemical energy store, in particular the battery, in particular automatically. The capture and/or evaluation device, the operating data memory and/or the communication interface is/are designed to draw electric power from the buffer capacitor, in particular automatically, during operation. This allows a demand by the capture and/or evaluation device, the operating data memory and/or the communication interface for electric power that, at least in the short term, may be greater than the drawable power of the electrochemical energy store, in particular the battery, to be covered. In particular, the buffer capacitor can be designed to be charged, in particular partially, by the electrochemical energy store during the inactive period, if provided for, and to be discharged, in particular partially, by the capture and/or evaluation device, the operating data memory and/or the communication interface during the active period, if provided for. In particular, the buffer capacitor can be designed to cover the demand for electric power during the active period completely. In particular, the operating mode control device can be designed to customize or coordinate the timing of the inactive period, in particular to the drawable power of the electrochemical energy store, such that the buffer capacitor is adequately charged. Additionally or alternatively, a voltage swing or a voltage ripple, in particular a value or an absolute value of the voltage swing, as a result of periodic charging and discharging can be a part of the voltage, in particular of a value or of an absolute value of the voltage, of the electrochemical energy store, in particular the battery. As a further addition or alternative, the buffer capacitor can be an MLCC capacitor and/or can have an X5R dielectric. As a further addition or alternative, the buffer capacitor can be electrically connected firstly to the operating mode control device and secondly to the electrochemical energy store, if present, or can be interposed. In other words: the operating mode control device can be electrically connected to the electrochemical energy store, if present, by means of the buffer capacitor. Put another way: the operating mode control device need not be electrically connected directly to the electrochemical energy store, if present.

In one refinement of the invention, the buffer capacitor has an electrical capacitance of no less than 50 microfarads (µF), in particular of no less than 100 µF, and/or of no more than 5000 µF, in particular of no more than 1000 µF, in particular of 470 µF. Additionally or alternatively, the buffer capacitor is designed for a voltage of no less than 1 V and of no more than 12 V, in particular of 3 V.

In one development of the invention, the operating data memory has an EEPROM operating data memory. The EEPROM operating data memory is designed to erase individual bits, in particular operating data that are no longer needed, in particular automatically. This allows time and hence energy to be saved, in particular in contrast to a FLASH operating data memory with a block-by-block erase process. In this respect, reference should also be made to the relevant specialist literature. Additionally or alternatively, the device or the operating data memory thereof, in particular the EEPROM operating data memory of the latter, can be designed to split a larger erase process over multiple intervals, if provided for.

In one development of the invention, the device has an, in particular electrical, output device, in particular a display. The output device is designed to output, in particular to display, an ON state of the device, in particular automatically. The output device is designed to draw electric power from the electrochemical energy store, in particular the battery, during operation, in particular automatically. The operating mode control device is designed to operate the output device, in particular automatically, in a, in particular the, normal temperature operating mode in particular at a temperature, in particular a value or an absolute value of the temperature, above a, in particular the, temperature limit value and to operate it, in particular automatically, in a, in particular the, low temperature operating mode, which is different from the normal temperature operating mode, at a temperature, in particular a value or an absolute value of the temperature, equal to or below the temperature limit value, such that less, in particular no, electric power is drawn from the electrochemical energy store, in particular the battery, by or for the output device in the low temperature operating mode than in the normal temperature operating mode. The device or the output device thereof allows the ON state of the device to be output to the user. In particular, the operating mode control device can be electrically connected to the output device. In particular, the operating mode control device can be electrically connected firstly to the output device and secondly to the electrochemical energy store, if present, or can be interposed. In other words: the output device can be electrically connected to the electrochemical energy store, if present, by means of the operating mode control device. Put another way: the output device need not be electrically connected to the electrochemical energy store, if present, directly.

The device described above with all or some of its properties can be intended to be able to be used with the motor-driven tool, in particular which can be driven by means of an electric motor and/or by means of an internal combustion engine, to capture operating data of the tool. In other words: use of the device for capturing operating data of the motor-driven tool, in particular which can be driven by means of an electric motor and/or by means of an internal combustion engine.

The system according to the invention has a device as described above and a motor-driven tool. In particular, the tool may be designed in part or wholly as described above.

In one development of the invention, the motor-driven tool is a manually guided, in particular hand-held or soil-guided, tool. In particular manually guided, in particular handheld, tool can mean that the tool can have a mass of no more than 50 kilograms (kg), in particular of no more than 20 kg, in particular of no more than 10 kg. Additionally or alternatively, the tool can be a garden and/or forestry tool or a soil cultivation tool.

In particular, the tool can be a saw, or a high-level delimber or a pole pruner, respectively, or a hedge trimmer, or a hedge cutter, or a leaf blower, or a leaf suction device, or a sweeping roller, or a sweeping brush, or a lawn mower, or a brushcutter, or a scarifier, or an angle grinder, or a rotovator, or a pressure washer, or a sprayer, or a drill.

In addition or as an alternative to the motor-driven tool, the system can have a terminal. In particular, the terminal can be designed in part or wholly as described above. Additionally or alternatively, the terminal can be any data-processing device, which can have a suitable wireless interface that can be designed for wireless communication with the communication interface of the device for capturing operating data. As a further addition or alternative, the terminal can form, or be, a gateway that can forward the received operating data to a server, such as to what is known as a cloud memory, that can store the operating data. The operating data stored in the cloud memory can then be viewed and evaluated by means of a suitable tool such as a web browser. As a further addition or alternative, the terminal can be a mobile terminal such as a laptop, a tablet or a smartphone. In particular mobile can be referred to as portable or manually guided, in particular handheld.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a graph of an electric power of the device of FIG. 1 in a normal temperature operating mode over time, FIG. 3 shows a graph of an electric power of the device of FIG. 1 in a low temperature operating mode over time.

DETAILED DESCRIPTION OF THE DRAWINGS

FIGS. 1 and 4 to 6 show a system 50 according to an embodiment of the invention. The system 50 has a device 1 and a motor-driven tool 60.

Figure 1:
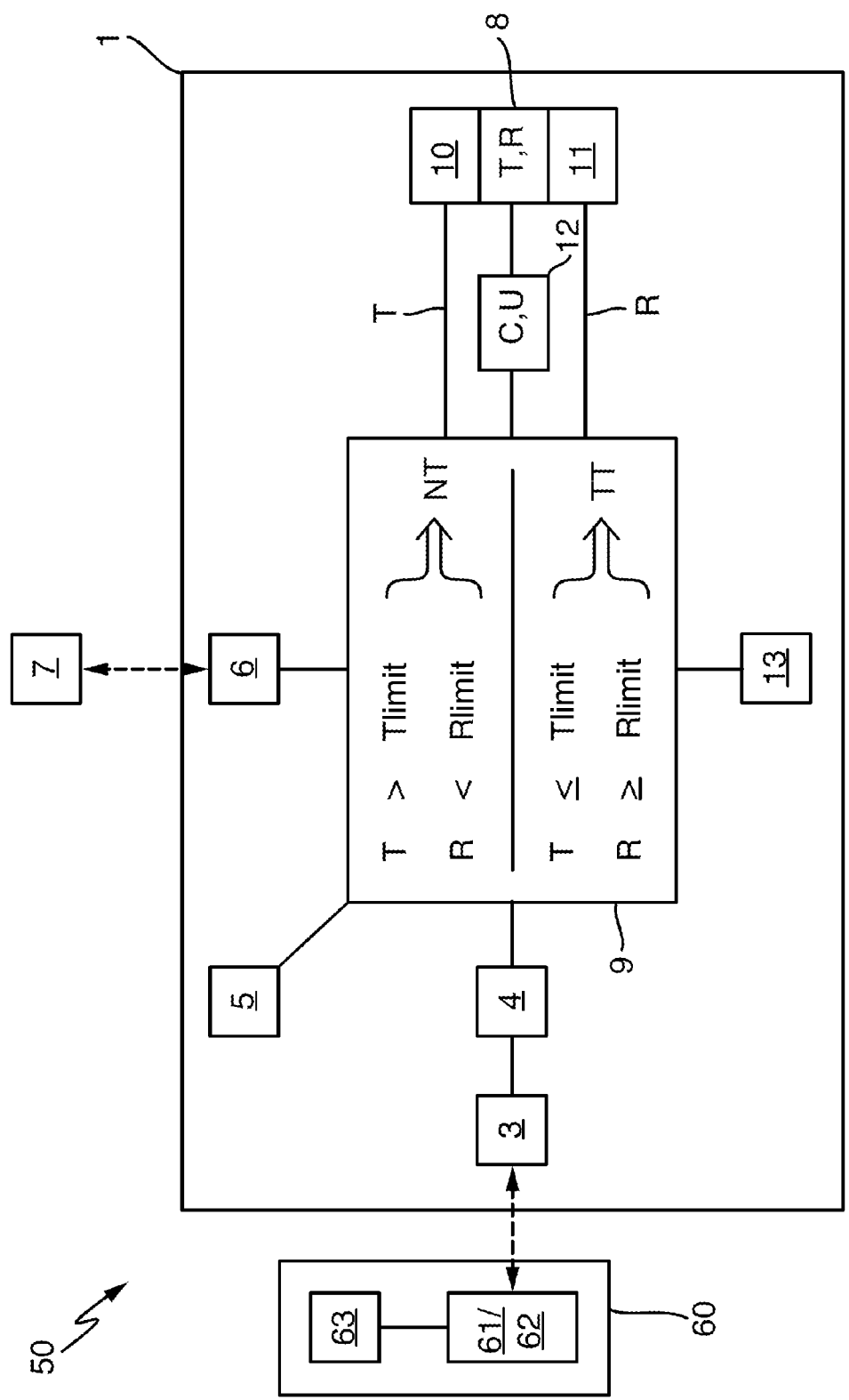
FIG. 1 shows a schematic block diagram of a system according to an embodiment of the invention with a device according to an embodiment of the invention for capturing operating data of a motor-driven tool, the motor-driven tool and a terminal.

In detail, the tool 60 has an electric drive motor 61 or an internal combustion drive engine 62, as shown in FIG. 1.

In addition, the motor-driven tool 60 is a manually guided tool. In the exemplary embodiment shown, the manually guided tool 60 is a handheld tool, In alternative exemplary embodiments, the manually guided tool can be a soil-guided tool.

Figure 6:
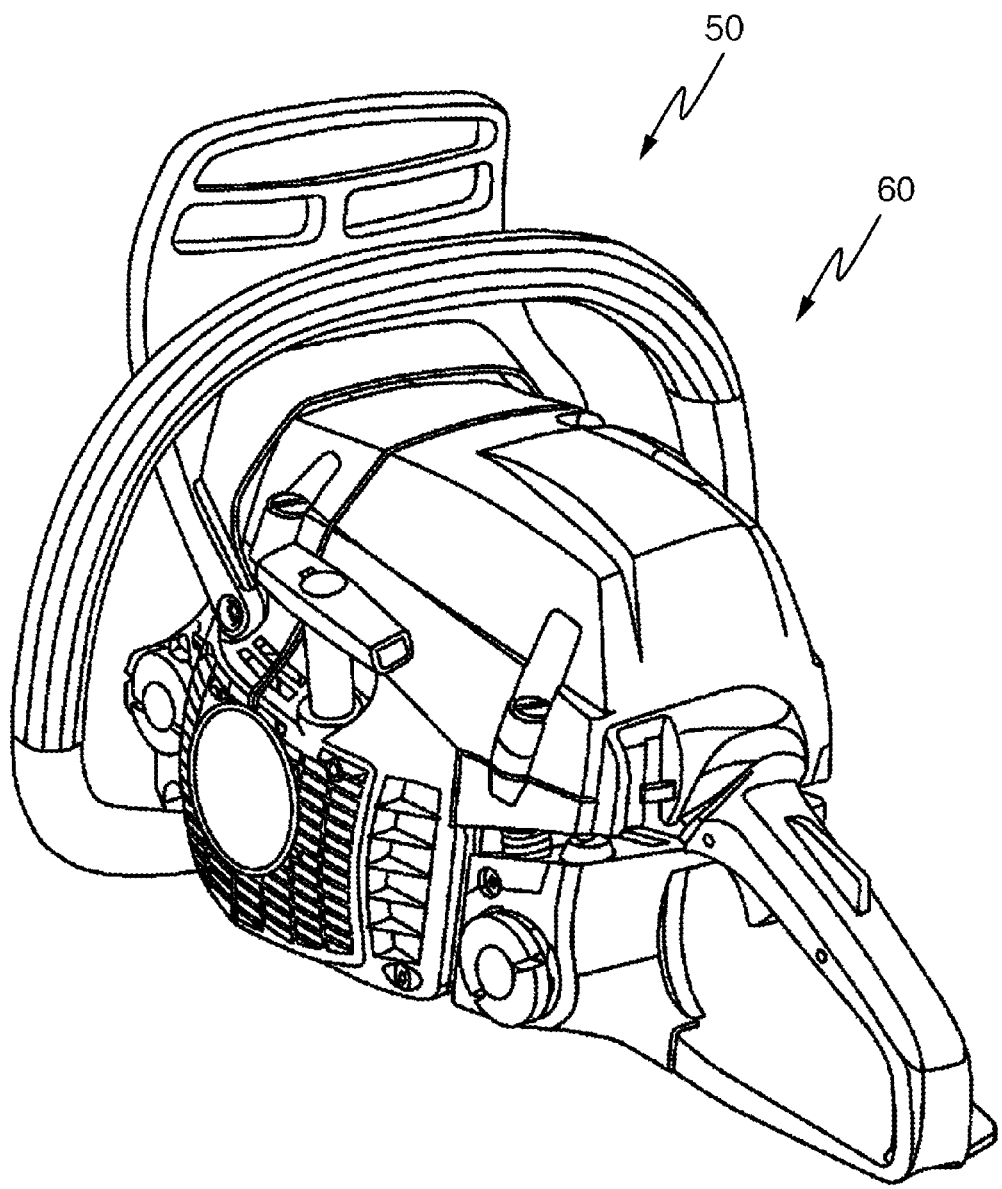
FIG. 6 shows a schematic perspective view of a detail of the motor-driven tool of FIG. 1.

In detail, the tool 60 is a saw, as shown in FIG. 6. The saw 60 has a saw chain 63, wherein in particular the electric drive motor 61 or the internal combustion drive engine 62 is designed to drive the saw chain 63. In alternative exemplary embodiments, the tool can be a high-level delimber or a pole pruner, respectively, or a hedge trimmer, or a hedge cutter, or a leaf blower, or a leaf suction device, or a sweeping roller, or a sweeping brush, or a lawn mower, or a brushcutter, or a scarifier, or an angle grinder, or a rotovator, or a pressure washer, or a sprayer, or a drill.

Additionally, the system 50 has a terminal 7.

Figure 4:
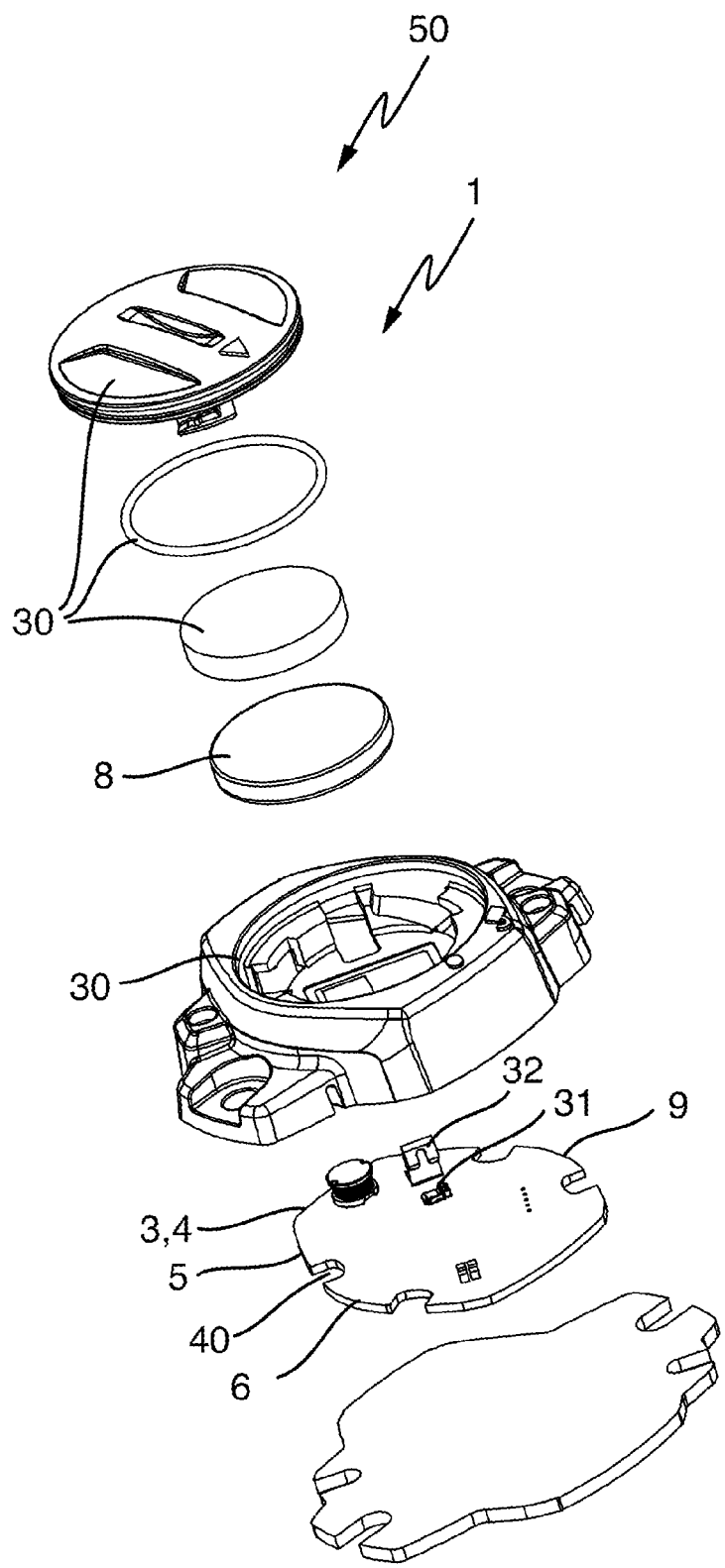
FIG. 4 shows a schematic exploded view of the device of FIG. 1.
Figure 5:
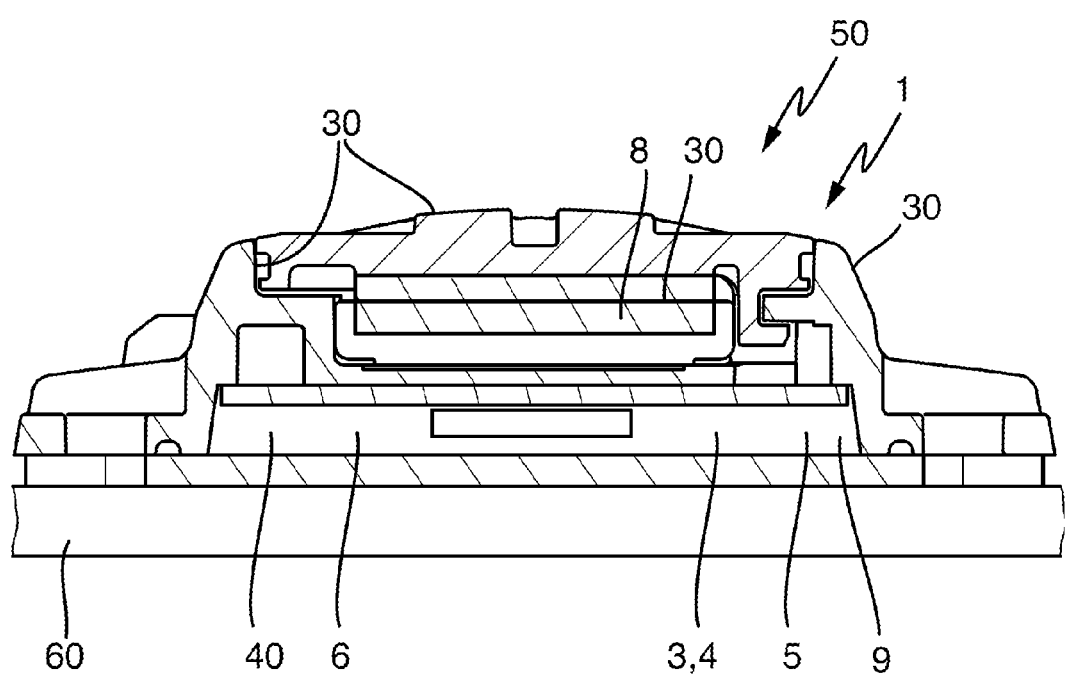
FIG. 5 shows a schematic longitudinal sectional view of the device of FIG. 1.

The device 1 according to the invention is designed for capturing operating data of the motor-driven tool 60. Additionally, the device 1 is designed for arrangement on the tool 60 or, in the exemplary embodiment shown, is arranged on the tool 60. Furthermore, the device has a capture and/or evaluation device 3, 4, as shown in FIGS. 1, 4 and 5. The capture and/or evaluation device 3, 4 is designed to capture at least one quantity, wherein the quantity is dependent on an operating state of the tool 60, and to evaluate the captured quantity for the purpose of ascertaining the operating data. Additionally or alternatively, the capture and/or evaluation device 3, 4 is designed to capture operating data. Also, the device has an operating data memory 5 and/or a communication interface 6. The operating data memory 5 is designed to store the ascertained and/or captured operating data. The communication interface 6 is designed to wirelessly transmit the operating data to the terminal 7. The capture and/or evaluation device 3, 4, the operating data memory 5 and/or the communication interface 6 is/are designed to draw electric power P8 from an electrochemical energy store 8, in particular a battery, during operation. In addition, the device has an operating mode control device 9 in the form of a microcontroller and a memory. The operating mode control device 9 is designed to operate the capture and/or evaluation device 3, 4, the operating data memory 5 and/or the communication interface 6 in a normal temperature operating mode NT at a temperature T above a temperature limit value Tlimit and to operate it/them in a low temperature operating mode TT, which is different from the normal temperature operating mode NT, at a temperature T equal to or below the temperature limit value Tlimit, such that less electric power P8 is drawn from the electrochemical store 8, in particular the battery, in the low temperature operating mode TT than in the normal temperature operating mode NT.

In the exemplary embodiment shown, the capture and/or evaluation device 3, 4 has a capture part 3 in the form of a sensor and an evaluation part 4 in the form of a microcontroller. In alternative exemplary embodiments, the capture and/or evaluation device may be in a different form.

Additionally, in the exemplary embodiment shown, the device 1 has the operating data memory 5 and the communication interface 6. In alternative exemplary embodiments, the device can have either the operating data memory or the communication interface.

In detail, the operating data memory 5 has an EEPROM operating data memory. The EEPROM operating data memory 5 is designed to erase individual bits.

Furthermore, in the exemplary embodiment shown, the operating mode control device 9 is designed to operate the capture and/or evaluation device 3, 4, the operating data memory 5 and the communication interface 6 in the normal temperature operating mode NT and in the low temperature operating mode TT. In alternative exemplary embodiments, the operating mode control device can be designed to operate either the capture and/or evaluation device or the operating data memory or the communication interface in the normal temperature operating mode and in the low temperature operating mode.

Additionally, the device 1 has the electrochemical energy store 8 in the form of the battery. In the exemplary embodiment shown, the battery is a CR 2032 button cell, in particular having a voltage of 3 V. In alternative exemplary embodiments, the battery can be a CR 2450 button cell or can be in another form.

In the exemplary embodiment shown, the temperature limit value Tlimit is −5° C. In alternative exemplary embodiments, the temperature limit value can be no more than +10° C. and/or no less than −20° C.

Also, the device 1 has a temperature sensor 10 or a resistance capture device 11.

In the exemplary embodiment shown, the temperature sensor 10 is designed to capture the temperature T, in particular of the electrochemical energy store or of the battery 8. The operating mode control device 9 is designed to operate the capture and/or evaluation device 3, 4, the operating data memory 5 and/or the communication interface 6 in the normal temperature operating mode NT when the temperature limit value Tlimit is exceeded by the captured temperature T and to operate it/them in the low temperature operating mode TT when the temperature limit value Tlimit is reached or not reached by the captured temperature T.

In alternative exemplary embodiments, the temperature sensor can additionally or alternatively be designed for capturing a quantity that is dependent on the temperature. The operating mode control device can be designed to operate the capture and/or evaluation device, the operating data memory and/or the communication interface in the normal temperature operating mode when a quantity limit value is exceeded by the captured quantity and in the low temperature operating mode when the quantity limit value is reached or not reached by the captured quantity.

In detail, the temperature sensor 10 is thermally connected to the electrochemical energy store or the battery 8. In the exemplary embodiment shown, the temperature sensor 10 is arranged in direct contact with the electrochemical energy store or the battery 8. In alternative exemplary embodiments, the temperature sensor can be arranged at a distance of no more than 5 cm from the electrochemical energy store or the battery. In addition, the operating mode control device 9 is electrically connected to the temperature sensor 10.

In the exemplary embodiment shown, the resistance capture device 11 is designed for capturing a resistance R of the electrochemical energy store or the battery 8. The operating mode control device 9 is designed to operate the capture and/or evaluation device 3, 4, the operating data memory 5 and/or the communication interface 6 in the normal temperature operating mode NT when a resistance limit value Rlimit is not reached by the captured resistance R and in the low temperature operating mode TT when the resistance limit value Rlimit is reached or exceeded by the captured resistance R.

In alternative exemplary embodiments, the resistance capture device can additionally or alternatively be designed for capturing a quantity that is dependent on the resistance. The operating mode control device can be designed to operate the capture and/or evaluation device, the operating data memory and/or the communication interface in the normal temperature operating mode when a quantity limit value is not reached by the captured quantity and in the low temperature operating mode when the quantity limit value is reached or exceeded by the captured quantity.

In detail, the resistance capture device 11 is electrically connected to the electrochemical energy store or the battery 8. Additionally, the operating mode control device 9 is electrically connected to the resistance capture device 11.

In the exemplary embodiment shown, the resistance limit value Rlimit is 1 kΩ In alternative exemplary embodiments, the resistance limit value can be no less than 100Ω and/or no more than 20 KΩ.

Furthermore, the operating mode control device 9 is designed to operate the capture and/or evaluation device 3, 4, the operating data memory 5 and/or the communication interface 6 in the normal temperature operating mode NT periodically in intervals I1 during a first active period twake1 and not to operate it/them during a first inactive period tsleep1, as shown in FIG. 2, and to operate it/them in the low temperature mode periodically in intervals I2 during a second active period twake2, which is shorter in time than the first, and/or not to operate it/them, or to render it/them without power, during a second inactive period tsleep2, which is longer in time than the first, as shown in FIG. 3.

In the exemplary embodiment shown, the first active period twake1 is 80 ms. In alternative exemplary embodiments, the first active period can be no less than 1 ms and/or no more than 3 s.

In addition, in the exemplary embodiment shown, the first inactive period tsleep1 is 920 ms. In alternative exemplary embodiments, the first inactive period can be no less than 100 ms and/or no more than 10 s.

Additionally, in the exemplary embodiment shown, the second active period twake2 is 40 ms. In alternative exemplary embodiments, the second active period can be no less than 1 ms and/or no more than 3 s.

Furthermore, in the exemplary embodiment shown, the second inactive period tsleep2 is 1960 ms. In alternative exemplary embodiments, the second inactive period can be no less than 500 ms and/or no more than 10 s.

In particular, in alternative exemplary embodiments, the first active period and the second active period can be of the same length in time and the first inactive period and the second inactive period can be of different length in time.

Also, the operating mode control device 9 is designed to respond to non-capture by means of the capture and/or evaluation device 3, 4 by setting the first inactive period tsleep1 to a maximum value and/or the second inactive period tsleep2 to a maximum value.

Additionally, the operating mode control device 9 is designed to respond to capture by means of the capture and/or evaluation device 3, 4 by setting the first inactive period tsleep1 to 920 ms and/or the second inactive period tsleep2 to 1960 ms.

In addition, the device 1 has a buffer capacitor 12. The buffer capacitor 12 is designed to draw electric power P8 from the electrochemical energy store or the battery 8. The capture and/or evaluation device 3, 4, the operating data memory 5 and/or the communication interface 6 is/are designed to draw electric power P3/4/5/6 from the buffer capacitor 12 during operation.

In the exemplary embodiment shown, the buffer capacitor 12 has an electrical capacitance C of 470 μF. In alternative exemplary embodiments, the buffer capacitor can have an electrical capacitance of no less than 50 μF and/or of no more than 5000 μF.

Additionally, in the exemplary embodiment shown, the buffer capacitor 12 is designed for a voltage of 3 V. In alternative exemplary embodiments, the buffer capacitor can be designed for a voltage of no less than 1 V and of no more than 12 V.

Furthermore, the device 1 has an output device 13, in particular a display in the form of a light emitting diode. The output device 13 is designed to output, in particular to display, an ON state of the device 1. The output device 13 is designed to draw electric power P8 from the electrochemical energy store or the battery 8 during operation. The operating mode control device 9 is designed to operate the output device 13 such that less electric power P8 is drawn from the electrochemical energy store or the battery 8 by the output device 13 in the low temperature operating mode TT than in the normal temperature operating mode NT.

In detail, the buffer capacitor 12 is electrically connected firstly to the electrochemical energy store or the battery 8 and secondly to the operating mode control device 9. The operating mode control device 9 is electrically connected firstly to the buffer capacitor 12 and secondly to the capture and/or evaluation device 3, 4, the operating data memory 5, the communication interface 6 and the output device 13.

In the exemplary embodiment shown, the device 1 or the capture and/or evaluation device 3, 4 thereof, the operating data memory 5 thereof, the communication interface 6 thereof, the operating mode control device 9 thereof and/or the output device 13 thereof is/are designed for a voltage of 3 V.

The buffer capacitor 12 covers a demand by the capture and/or evaluation device 3, 4, the operating data memory 5, the communication interface 6 and/or the output device 13 for electric power P3/4/5/6/13, which is greater than the drawable power P8 of the electrochemical energy store or the battery 8 during the active period twake1, twake2, in particular completely, as shown in FIGS. 2 and 3.

In detail, the buffer capacitor 12 is charged by the electrochemical energy store or the battery 8 during the inactive period tsleep1, tsleep2 and discharged by the capture and/or evaluation device 3, 4, the operating data memory 5, the communication interface 6 and/or the output device 13 during the active period twake1, twake2, as shown in FIGS. 2 and 3. A voltage swing as a result of periodic charging and discharging of the buffer capacitor 12 is a portion of the voltage of the electrochemical energy store or the battery 8, in particular 200 mV at 3 V or 2.9 V to 3.1 V.

In the normal temperature operating mode NT, the operating mode control device 9 operates the capture and/or evaluation device 3, 4, the operating data memory 5, the communication interface 6 and/or the output device 13 periodically in the intervals I1 during the first active period twake1 and not during the first inactive period tsleep1, as shown in FIG. 2.

As the temperature T falls, the drawable power P8 of the electrochemical energy store or the battery 8 falls.

In the low temperature operating mode TT, the operating mode control device 9 operates the capture and/or evaluation device 3, 4, the operating data memory 5 and/or the communication interface 6 periodically in the intervals I2 during the second active period twake2 and not during the second inactive period tsleep2, as shown in FIG. 3. Also, the operating mode control device 9 renders the output device 13 without function, or does not operate it or leaves it off, in the low temperature operating mode TT.

The device 1 or the non-operation or leaving-off of the output device 13 admittedly no longer allows the ON state of the device 1 to be output to the user. However, the communication interface 6 still transmits the operating data wirelessly to the terminal 7 and therefore allows the user to find out or gather that the device 1 is in the ON state.

In the exemplary embodiment shown, the device 1 or the buffer capacitor 12 thereof is designed for operation of the device 1 up to and including −30° C. In alternative exemplary embodiments, the device or the buffer capacitor thereof can be designed for operation of the device for a different temperature value.

In detail, in the exemplary embodiment shown, the temperature limit value Tlimit is the same for the capture and/or evaluation device 3, 4, the operating data memory 5, the communication interface 6 and the output device 13. In alternative exemplary embodiments, the temperature limit value can be different or individual for the capture and/or evaluation device, the operating data memory, the communication interface and the output device, if present.

In addition, in the exemplary embodiment shown, the resistance limit value Rlimit is the same for the capture and/or evaluation device 3, 4, the operating data memory 5, the communication interface 6 and the output device 13. In alternative exemplary embodiments, the resistance limit value can be different or individual for the capture and/or evaluation device, the operating data memory, the communication interface and the output device, if present.

Additionally, in the exemplary embodiment shown, the first active period twake1, the first inactive period tsleep1, the second active period twake2 and the second inactive period tsleep2, in particular each, is the same for the capture and/or evaluation device 3, 4, the operating data memory 5, the communication interface 6 and the output device 13. In alternative exemplary embodiments, the first active period, the first inactive period, the second active period and/or the second inactive period can, in particular each, be different or individual for the capture and/or evaluation device, the operating data memory, the communication interface and the output device, if present.

Furthermore, the device 1 is designed to be separate from the motor-driven tool 60, as shown in FIGS. 4 and 5.

Also, the device 1 has a housing 30. The housing 30 is designed to hold the electrochemical energy store or the battery 8.

In addition, the device 1 has resilient electrical contact elements 31, 32, two in the exemplary embodiment shown. The resilient electrical contact elements 31, 32 are designed to make electrical contact with corresponding electrical contacts of the accommodated electrochemical energy store or the accommodated battery 8.

Additionally, the contact elements 31, 32 are routed from the housing 30 to the outside, where they are electrically connected to corresponding connections, in particular on a circuit board 40 of the device 1.

In detail, the circuit board 40 is arranged on an underside of the housing 30. In particular, the circuit board 40 is mechanically connected to the housing 30.

In the exemplary embodiment shown, the circuit board 40 has the capture and/or evaluation device 3, 4, the operating data memory 5, the communication interface 6 and the operating mode control device 9.

As the exemplary embodiments shown, and explained above, make clear, the invention provides a device for capturing operating data of a motor-driven tool, said device being reliable, in particular at a low temperature, and a system having such a device and a motor-driven tool.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for capturing operating data of a motor-driven tool, wherein the device is configured for arrangement on the tool, the device comprising:
   a capture and/or evaluation device, wherein the capture and/or evaluation device is configured to capture at least one quantity, wherein the quantity is dependent on an operating state of the tool, and to evaluate the captured quantity for the purpose of ascertaining the operating data, and/or to capture operating data;
   an operating data memory, wherein the operating data memory is configured to store the ascertained and/or captured operating data, and/or a communication interface, wherein the communication interface is configured to transmit the operating data wirelessly to a terminal,
   wherein the capture and/or evaluation device, the operating data memory and/or the communication interface draw electric power from an electrochemical energy store during operation; and
   an operating mode control device, wherein the operating mode control device is configured to operate the capture and/or evaluation device, the operating data memory and/or the communication interface at a temperature above a temperature limit value in a normal temperature operating mode and at a temperature equal to or below the temperature limit value in a low temperature operating mode, which is different from the normal temperature operating mode, such that less electric power is drawn from the electrochemical energy store in the low temperature operating mode than in the normal temperature operating mode.

2. The device according to claim 1, further comprising the electrochemical energy store.

3. The device according to claim 1, wherein the temperature limit value is no more than +10° C. and/or no less than −20° C.

4. The device according to claim 1, further comprising:
   a temperature sensor, wherein the temperature sensor captures the temperature and/or a quantity that is dependent on the temperature, and
   wherein the operating mode control device is configured to operate the capture and/or evaluation device, the operating data memory and/or the communication interface in the normal temperature operating mode when the temperature limit value is exceeded by the captured temperature or a quantity limit value is exceeded by the captured quantity and in the low temperature operating mode when the temperature limit value is reached or not reached by the captured temperature or the quantity limit value is reached or not reached by the captured quantity.

5. A device for capturing operating data of a motor-driven tool, wherein the device is configured for arrangement on the tool, the device comprising:
   a capture and/or evaluation device, wherein the capture and/or evaluation device is configured to capture at least one quantity, wherein the quantity is dependent on an operating state of the tool, and to evaluate the captured quantity for the purpose of ascertaining the operating data, and/or to capture operating data;
   an operating data memory, wherein the operating data memory is configured to store the ascertained and/or captured operating data, and/or a communication interface, wherein the communication interface is configured to transmit the operating data wirelessly to a terminal,
   wherein the capture and/or evaluation device, the operating data memory and/or the communication interface draw electric power from an electrochemical energy store during operation; and
   an operating mode control device, wherein the operating mode control device is configured to operate the capture and/or evaluation device, the operating data memory and/or the communication interface at a temperature above a temperature limit value in a normal temperature operating mode and at a temperature equal to or below the temperature limit value in a low temperature operating mode, which is different from the normal temperature operating mode, such that less electric power is drawn from the electrochemical energy store in the low temperature operating mode than in the normal temperature operating mode, further comprising:
- a resistance capture device, wherein the resistance capture device captures a resistance of the electrochemical energy store and/or a quantity that is dependent on the resistance, and
- wherein the operating mode control device is configured to operate the capture and/or evaluation device, the operating data memory and/or the communication interface in the normal temperature operating mode when a resistance limit value is not reached by the captured resistance or a quantity limit value is not reached by the captured quantity and in the low temperature operating mode when the resistance limit value is reached or exceeded by the captured resistance or the quantity limit value is reached or exceeded by the captured quantity.

6. The device according to claim 5, wherein the resistance limit value is no less than 100Ω and/or no more than 20 kΩ.

7. A device for capturing operating data of a motor-driven tool, wherein the device is configured for arrangement on the tool, the device comprising:
- a capture and/or evaluation device, wherein the capture and/or evaluation device is configured to capture at least one quantity, wherein the quantity is dependent on an operating state of the tool, and to evaluate the captured quantity for the purpose of ascertaining the operating data, and/or to capture operating data;
- an operating data memory, wherein the operating data memory is configured to store the ascertained and/or captured operating data, and/or a communication interface, wherein the communication interface is configured to transmit the operating data wirelessly to a terminal,
- wherein the capture and/or evaluation device, the operating data memory and/or the communication interface draw electric power from an electrochemical energy store during operation; and
- an operating mode control device, wherein the operating mode control device is configured to operate the capture and/or evaluation device, the operating data memory and/or the communication interface at a temperature above a temperature limit value in a normal temperature operating mode and at a temperature equal to or below the temperature limit value in a low temperature operating mode, which is different from the normal temperature operating mode, such that less electric power is drawn from the electrochemical energy store in the low temperature operating mode than in the normal temperature operating mode,
- wherein the operating mode control device is configured to operate the capture and/or evaluation device, the operating data memory and/or the communication interface in the normal temperature operating mode periodically in intervals during a first active period and not to operate it/them during a first inactive period and to operate it/them in the low temperature mode periodically in intervals during a second active period, which is shorter in time than the first, and/or not to operate it/them, or to render it/them without power, during a second inactive period, which is longer in time than the first.

8. The device according to claim 7, wherein
the first active period is no less than 1 ms and/or no more than 3 s, and/or the first inactive period is no less than 100 ms and/or no more than 10 s,
the second active period is no less than 1 ms and/or no more than 3 s, and/or the second inactive period is no less than 500 ms and/or no more than 10 s.

9. The device according to claim 8, wherein
the operating mode control device is configured to respond to non-capture of a quantity or operating data by the capture and/or evaluation device by setting the first inactive period to a maximum value and/or the second inactive period to a maximum value.

10. The device according to claim 1, further comprising:
a buffer capacitor, wherein the buffer capacitor draws electric power from the electrochemical energy store, and
wherein the capture and/or evaluation device, the operating data memory and/or the communication interface are configured to draw electric power from the buffer capacitor during operation.

11. The device according to claim 10, wherein
the buffer capacitor has an electrical capacitance of no less than 50 µF and/or of no more than 5000 µF, and/or
the buffer capacitor is configured for a voltage of no less than 1 V and of no more than 12 V.

12. The device according to claim 1, wherein
the operating data memory has an EEPROM operating data memory, the EEPROM operating data memory being designed to erase individual bits.

13. The device according to claim 1, further comprising:
an output device, wherein the output device is configured to output an ON state of the device, wherein the output device draws electric power from the electrochemical energy store during operation, and
wherein the operating mode control device is configured to operate the output device such that less electric power is drawn from the electrochemical energy store by the output device in the low temperature operating mode than in the normal temperature operating mode.

14. The device according to claim 1, wherein
the temperature limit value is no more than 0° C. and/or no less than −5° C.

15. The device according to claim 7, wherein
the first active period is 80 ms and/or the first inactive period is 920 ms, and/or
the second active period is 40 ms and/or the second inactive period is 1960 ms.

16. The device according to claim 10, wherein
the buffer capacitor has an electrical capacitance of no less than 100 µF and/or of no more than 1000 µF, and/or
the buffer capacitor is configured for a voltage of 3 V.

17. The device according to claim 13, wherein
the output device is a display.

18. A system comprising:
a device according to claim 1; and
a motor-driven tool.

19. The system according to claim 18, wherein
the motor-driven tool is a manually guided tool.

20. The system according to claim 19, wherein the motor-driven tool is a hand-held or soil-guided tool.

* * * * *